Aug. 15, 1961 F. T. ANDREWS, JR 2,996,578

BIPOLAR PULSE TRANSMISSION AND REGENERATION

Filed Jan. 19, 1959 4 Sheets-Sheet 1

INVENTOR
F. T. ANDREWS, JR.
BY R. B. Andis
ATTORNEY

Aug. 15, 1961 F. T. ANDREWS, JR 2,996,578

BIPOLAR PULSE TRANSMISSION AND REGENERATION

Filed Jan. 19, 1959 4 Sheets-Sheet 2

INVENTOR
F. T. ANDREWS, JR.
BY R. B. Andis
ATTORNEY

BIPOLAR PULSE TRANSMISSION AND REGENERATION

Filed Jan. 19, 1959 4 Sheets-Sheet 3

INVENTOR
F. T. ANDREWS, JR.
BY R. B. Anderson
ATTORNEY

BIPOLAR PULSE TRANSMISSION AND REGENERATION

Filed Jan. 19, 1959 4 Sheets-Sheet 4

INVENTOR
F. T. ANDREWS, JR.
BY R. B. Anderson
ATTORNEY

United States Patent Office 2,996,578

Patented Aug. 15, 1961

2,996,578

BIPOLAR PULSE TRANSMISSION AND REGENERATION

Frederick T. Andrews, Jr., Berkeley Heights, N.J., assignor to Bell Telephone Laboratories, Incorporated, New York, N.Y., a corporation of New York Filed Jan. 19, 1959, Ser. No. 787,535
5 Claims. (Cl. 178—70)

This invention relates to the transmission of information by pulse techniques and more particularly, although in its broader aspects not exclusively, to such transmission in systems containing regenerative pulse amplifiers.

A principal object of the invention is to eliminate or reduce in as simple a manner as possible the tendency of the center line of an irregular pulse train to wander or drift in potential.

A related object is to achieve greater threshold stability in a signal pulse train in as simple a manner as possible so that full advantage of a digital transmission system can be realized with a minimum of additional circuit complexity.

An outstanding advantage of transmission by pulse code modulation techniques is that the pulse train may be regenerated at a repeater station before the pulses have been degraded by noise or apparatus defects to a point where they can no longer be reliably decoded. After such regeneration, the pulses are again clean and sharp and such regeneration can be carried on successively at a number of repeater points between a transmitter station and a receiver station.

To carry out such regeneration it is desirable that the current or voltage amplitudes of the pulses and spaces not sag toward the average current or voltage. When the transmission is by carrier, this problem is not present; but when the pulse train is transmitted without modulation all the low frequency components must be preserved to prevent drift. Known direct current restoring schemes are not fully satisfactory to prevent this drift because they tend to complicate the apparatus and do not work well under all conditions likely to be encountered.

This invention eliminates center line drift by the generation of a special bipolar pulse train which is inherently free of such drift. Each binary "0" is transmitted as the absence of a pulse and each binary "1" is transmitted as a pulse opposite in polarity to the preceding pulse. Because each successive "1" is of opposite polarity, the low frequency tail of one pulse is automatically canceled by the tail of the oppositely poled pulse that follows it eventually and the pulse train is inherently free of center line drift. Receiving means convert all received pulses into pulses of like polarity.

In one embodiment of the invention, the special bipolar pulse train is derived from the original pulse train by using the original pulse train to operate a so-called bistable or binary countercircuit. The output of the binary counter changes state in response to the onset of each pulse in the original pulse train. The resulting output pulses are then differentiated, yielding a bipolar pulse train which is identical to the original binary code pulse train except that successive "1's" are of opposite polarity. Because center line drift is absent from the bipolar pulse train accurate regeneration of the pulses can be accomplished with a simple combination of a full-wave rectifier and another binary counter. At the receiving station rectification of the special bipolar pulse train yields the original unipolar binary code pulse train and the message signal is derived therefrom.

The invention will be more fully understood from the following detailed description of preferred embodiments thereof taken in conjunction with the appended drawings, in which.

Figure 1:
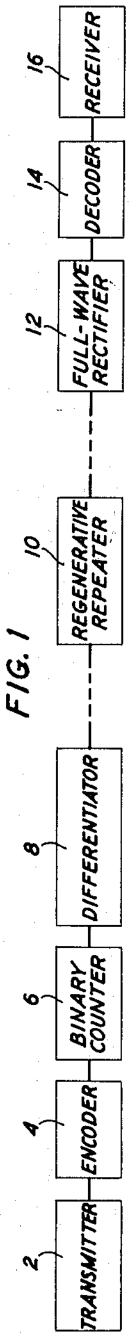
FIG. 1 is a block diagram showing a complete pulse code modulation system embodying the invention.

FIG. 1 shows a system embodying the invention. The output of transmitter 2 is converted into a chain of so-called on-off pulses arranged in the binary permutation code by the encoder 4. Encoder 4 may be of any desired variety, one suitable one being that described by R. W. Sears in the Bell System Technical Journal for January 1948, vol. 27, at page 44. The output of the encoder 4 is applied to a binary counter circuit 6 which changes its state of operation upon the occurrence of each pulse in the binary pulse code train. A differentiator 8 connected to the output of the binary counter 6 generates pulses of opposite polarity at the beginning and end of each pulse received from the binary counter 6.

Figure 2:
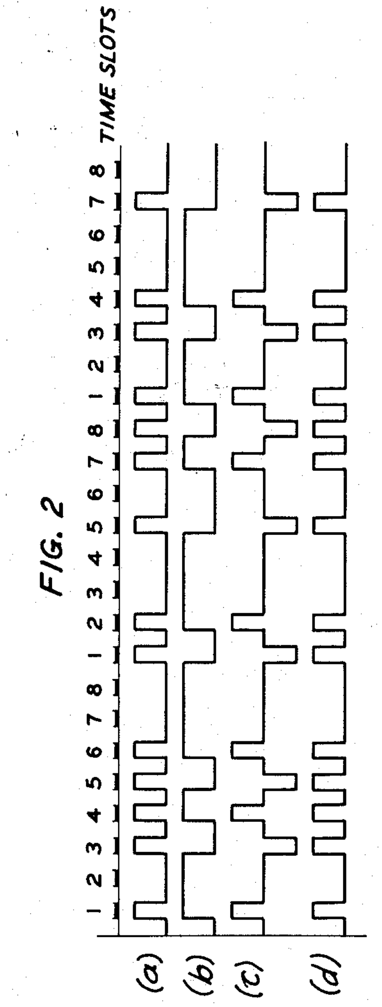
FIG. 2 is a group of waveform diagrams which are of assistance in explaining the operation of the invention.

In FIG. 2(*a*) the encoded signal output from encoder 4 for six digit code groups is shown and FIG. 2(*b*) shows the output of the binary counter corresponding to that signal. The output of the differentiator 8, corresponding to the encoded signal shown in FIG. 2(*a*), is shown in FIG. 2(*c*). The signals shown in FIGS. 2(*a*) and 2(*c*) are identical with the exception that each successive "1" shown in FIG. 2(*a*) is of opposite polarity. The waveform in FIG. 2(*c*) is inherently free of any center line drift since the low frequency tail of each pulse is canceled by the oppositely poled low frequency tail of the succeeding pulse. In other words, the waveform shown in FIG. 2(*c*) contains no D.-C. component, and very little low frequency A.-C. The pulse train can now be accurately regenerated as often as necessary.

In FIG. 1 the output of the differentiator is connected to a regenerative repeater 10 by means of a suitable transmission medium. At the receiving station, the waveform shown in FIG. 2(*c*) is converted back into the original binary code pulse train by rectifying the signal in a full-wave rectifier 12. The output of the full-wave rectifier is applied to a conventional binary decoder 14 of any desired variety, one suitable example being that described by L. A. Meacham and E. Peterson in the Bell System Technical Journal for January 1948, vol. 27 at page 1. The decoded output may then be applied to the receiver 16.

Figure 3:
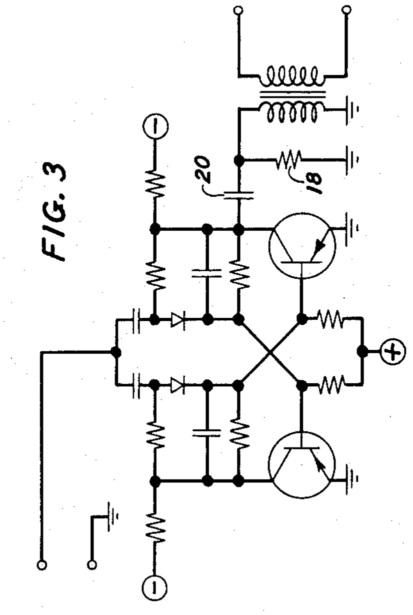
FIG. 3 is a schematic diagram showing a binary counter-differentiator combination suitable for use in the PCM system shown in FIG. 1.

A transistor bistable or flip-flop circuit 6 suitable for use in the embodiment of the invention appearing in FIG. 1 is shown in FIG. 3. Any suitable binary counter circuit can, of course, be used in this system; the circuit shown is described in Hunter, Handbook of Semiconductor Devices, pages 15–40, published by McGraw-Hill in 1956. The output of the binary counter circuit is connected to a differentiator 8 comprising the R-C combination of a resistor 18 and a capacitor 20. The output of the differentiator 8, which is the pulse train shown in FIG. 2(*c*), is then transmitted to the regenerative repeater 10 over the transmission medium.

Figure 4:
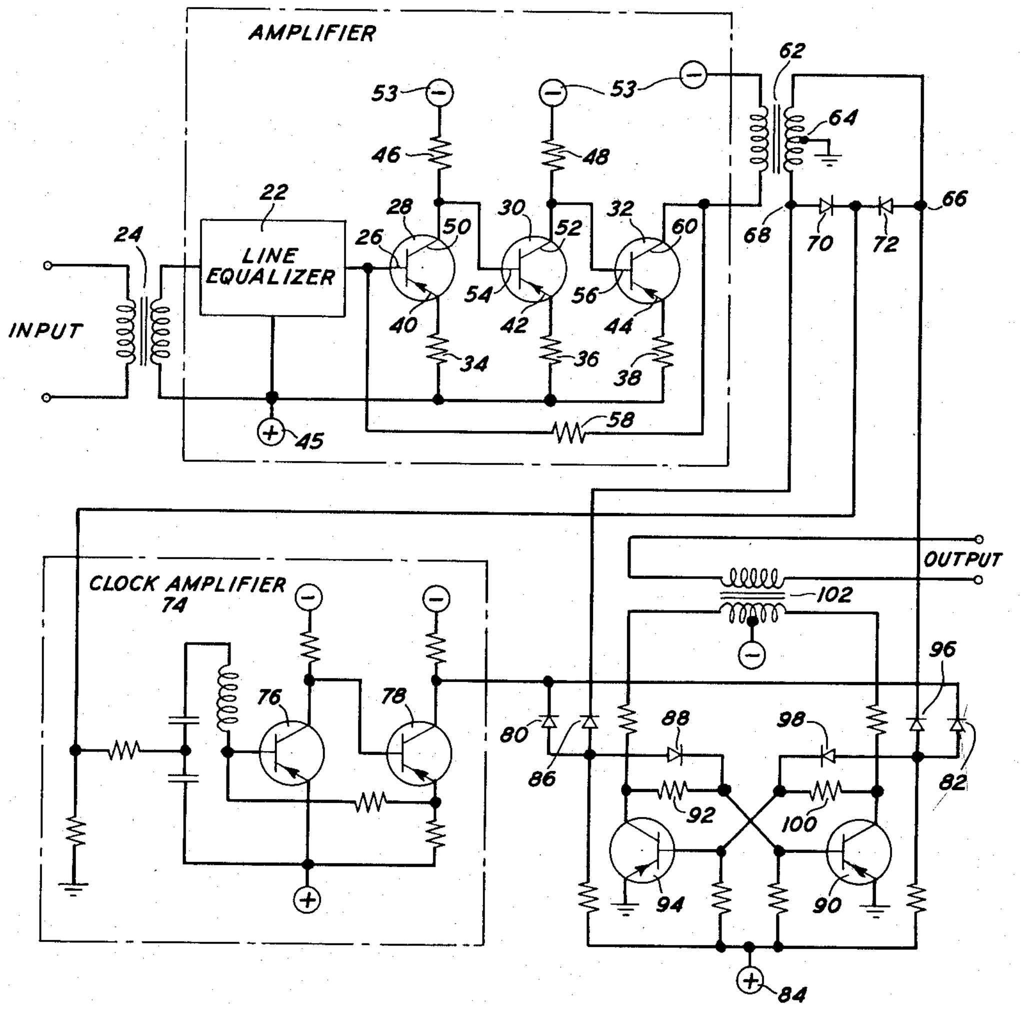
FIG. 4 is a schematic circuit diagram of a complete bipolar pulse repeater embodying important features of the invention.

At the regenerative repeater 10, which is shown in detail in FIG. 4, the signal to be regenerated is applied to a line equalizer 22 by means of transformer 24. The line equalizer 22 eliminates the attenuation and distortion introduced by transmission and may be of any desired variety, one suitable example being that shown in FIG. 2 of application Serial No. 779,731 filed December 11, 1958, by F. T. Andrews, Jr., and E. E. Sumner. The output of the line equalizer 22 is connected to the base 26 of the first transistor 28 of a three-stage transistor amplifier comprising p-n-p transistors 28, 30 and 32. Resistors 34, 36 and 38 connect emitters 40, 42 and 44 to one side of the input and to a source of positive voltage 45. Resistors 46 and 48 connect the collectors 50 and 52 to transistors 28 and 30 to a source of negative voltage 53. Voltages 45 and 53 provide proper biasing of the transistors. The collector 50 of transistor 28 is connected to the base 54 of transistor 30 and the collector 52 of transistor 30 is connected to the base 56 of transistor 32. Over all negative feedback is provided by means of resistor 58 connected from the collector 60 of transistor 32 to the base 26 of transistor 28. The output of the amplifier is taken from the collector 60 of transistor 32 connected to one input terminal of the primary winding of transformer 62. The other input terminal of the primary winding is connected to the source of negative potential 53 which provides proper biasing of transistor 32. The secondary winding of transformer 62 has a grounded center tap 64; normal and inverted signals, available on either side of the center-tapped secondary at terminals 66 and 68, drive a simple two-diode 70 and 72 rectifier.

Since the full-wave rectified output is in the form of a normal binary pulse code train it has a frequency component of the basic pulse repetition rate. The full-wave output is applied to a so-called "clock" amplifier 74 by means of a filter tuned to allow only the basic pulse repetition frequency to pass. The pulse repetition or clock frequency is then amplified by a two-stage negative feedback amplifier comprising transistors 76 and 78. The output of the clock amplifier 74 which is a signal whose frequency is that of the basic pulse repetition rate, is applied to the cathodes of two diodes 80 and 82. These diodes 80 and 82 are, in the absence of a pulse voltage from the clock amplifier, forward-biased by positive voltage 84.

The signal available on terminal 68 of the secondary winding of transformer 62 is applied to the cathode of diode 86. The anodes of diodes 80 and 86 are connected to the anode of diode 88 whose cathode is connected to the base of transistor 90 and through a resistor 92 to the collector of transistor 94. The signal available at terminal 66 of the secondary winding of transformer 62 is applied to the cathode of a diode 96. The anodes of diode 82 and 96 are connected to the anode of diode 98 whose cathode is connected to the base of transistor 94 and also connected through a resistor 100 to the collector of transistor 90. When transistor 94 is conducting and transistor 90 is nonconducting the simultaneous occurrence of a positive voltage output from the clock amplifier 74 and a positive voltage output at terminal 66 of transformer 62 back biases diodes 82 and 96. Current then flows from positive voltage source 84 through diode 98 to the base of transistor 94. As a result, transistor 94 shuts off. At the same time the voltage at the base of transistor 94 falls because the collector of transistor 94 and base of transistor 90 are connected by resistor 92. The voltage at the base of transistor 90 is free to drop because the output of center-tapped transformer 62 at terminal 68 is negative when the output at terminal 66 is positive, forward-biasing diode 86 and turning off the current flow in diode 88. Transistor 90 then turns on.

Figure 5:
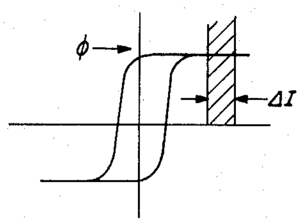
FIG. 5 is a hysteresis diagram of a transformer particularly sutiable for use in bipolar pulse repeaters embodying the invention.

When a positive pulse appears at terminal 68, and a positive pulse appears at the output of the clock amplifier, transistor 94 is turned on again and transistor 90 is turned off. Since the flip-flop comprising transistors 90 and 94 can only change states when positive output from the clock amplifier occurs with positive output from one output terminal of the transformer 62 the clock amplifier assures accurate tuning of the output signal. Oppositely poled windings of an output transformer 102 are connected in series with the collector of each transistor 90 and 94. The reversal of magnetizing current resulting from a change in the binary state of the flip-flop when negative pulses are applied alternately to the transistor bases causes a reversal of the transformer flux. Oppositely poled pulses (shown in FIG. 2(*c*)) appear across the secondary of transformer 102. The time constant of the transformer inductance together with its associated load and driving currents determines the duration of the pulse that is produced. By suitable choice of the magnetizing inductance a pulse of desired width is produced. Better control of the pulse shape can be achieved if the transformer is of the saturating type with a hysteresis loop of the sort shown in FIG. 5. Because of saturation only a fixed flux change can take place regardless of variations in the driving current amplitude; this fixes the voltage time integral or area of the pulse.

Figure 6:
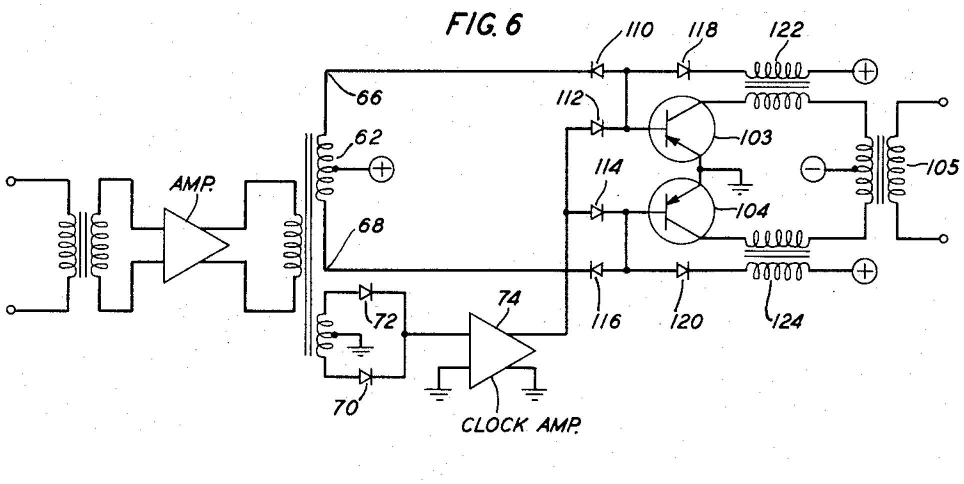
FIG. 6 is a schematic circuit diagram showing an important modification of the repeater of FIG. 4.

Rather than use a transistor flip-flop and rely on the transformer 102 to shape the output pulses, two blocking oscillators as shown in FIG. 6 may be used. In FIG. 6, series feedback from the collector to the base of each of two transistors 103 and 104 is used to oppositely drive a common output transformer 105. The input gating arrangement causes the clock amplifier to control not only the turn on but also the turn off the blocking oscillators. The output of the clock amplifier 74 is connected to the anodes of diodes 112 and 114. The cathodes of diodes 112 and 114 are connected to the bases of transistors 103 and 104, respectively; the anodes of diodes 110 and 116, respectively; and the anodes of diodes 118 and 120, respectively. The cathodes of diodes 110 and 116 are respectively connected to the output terminals 66 and 68 of transformer 62. The cathodes of diodes 118 and 120 are each connected to a source of positive voltage by means of one winding of transformers 122 and 124, respectively.

A negative voltage at the base of either transistor 103 or 104 causes that transistor to turn on. A negative voltage can only be applied to the base of either transistor 103 or 104 if there occurs at the same instant of time a negative voltage output from the clock amplifier 74 and a negative voltage at terminal 66 or 68, respectively. The simultaneous occurrence of a negative output voltage from the clock amplifier 74 and a negative voltage at terminal 66 causes transistor 103 to turn on. Similarly, the occurrence at the same instant of time of a negative voltage at the output of the clock amplifier 74 and at the terminal 68 turns transistor 104 on. Since normal and inverted signals are available at the terminals 66 and 68 of center-tapped transformer 62 only one transistor can operate at any given time. When a transistor is operating, a positive output voltage from the clock amplifier causes it to turn off. The output of transformer 105 has a long time constant so that the pulse duration is determined solely by the blocking oscillator and so that negligible transient voltages occur when the current from either blocking oscillator terminates.

Figure 7:
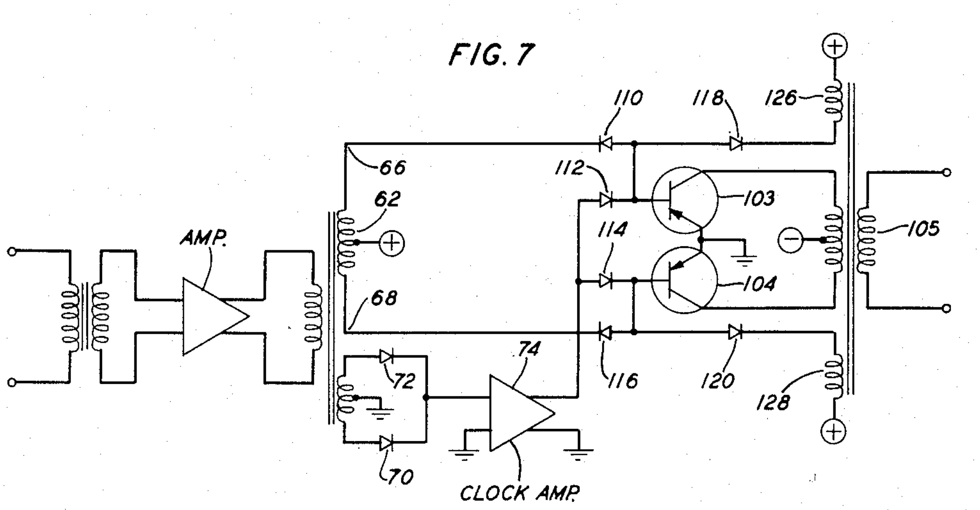
FIG. 7 is a schematic circuit diagram showing a simplification of the repeater illustrated in FIG. 6.

A further simplification of the circuitry shown in FIG. 6 is shown in FIG. 7 where additional windings 126, 128 on the output transformer 105 provide the required blocking oscillator feedback.

In the bipolar repeater scheme shown in FIG. 4 the inherent memory in the binary counter circuit insures that a positive pulse can be followed only by a negative pulse. Therefore, the insertion of a false pulse opposite in polarity to the last transmitted pulse or the loss of any pulse results in exactly two errors in the binary code. The probability of these two effects occurring is equal for a random signal and for some value P. The probability of error is therefore 4P. A different situation exists for the circuit shown in FIGS. 6, 7 and 8. The omission of a pulse or the insertion of a pulse causes only one digital error because of the lack of memory which is inherent in the flip-flop circuit shown in FIG. 4. Since the omission of a pulse or the insertion of either a positive or negative pulse causes only one digital error, the latter event has the probability of 2P and the total probability of error in the final binary code is only 3P.

Figure 8:
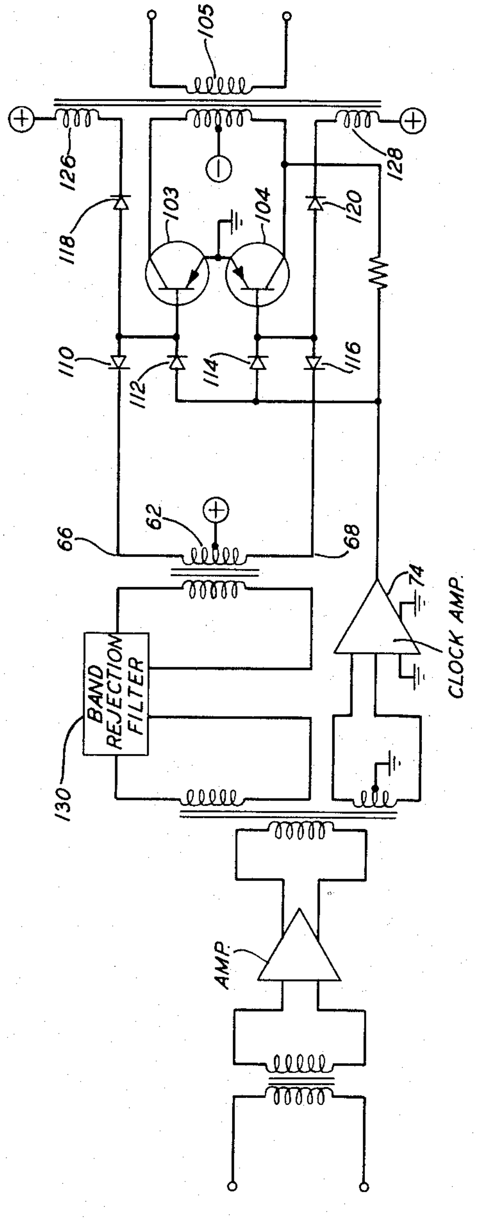
FIG. 8 is a schematic circuit diagram of still another bipolar pulse repeater embodying the invention.

Because the frequency spectrum of the bipolar pulse train has no frequency component at the pulse repetition frequency, a timing signal may be added at one end of the system and subtracted at the other end without any interaction between the timing and information signals. This makes it possible to obtain the effect of an entirely separate timing channel using a single pair of wires. FIG. 8 shows a bipolar repeater embodying the invention for use in a system wherein the timing signals are superimposed on the bipolar pulse train in the manner taught by the above-identified copending application filed by F. T. Andrews, Jr. and E. E. Sumner. The circuit shown in FIG. 8 is similar to that shown in FIG. 7. The signal input in FIG. 8, however, consists of the bipolar pulse train with the timing wave superimposed. Following amplification, as in FIG. 7, the equalized input is applied to the clock amplifier 74 to derive the timing wave. The timing wave output of the clock amplifier 74 is used to control the turn-on and turn-off, as in FIGS. 6 and 7, of the blocking oscillators 103 and 104, and is also applied to the output of the blocking oscillators. The presence of the timing signal in the input wave eliminates the need for the full-wave rectifier consisting of diodes 70 and 72 which is shown in FIGS. 4, 6 and 7. A band-rejection filer 130 is inserted between the equalizing amplifier and the center-tapped transformer 62 to eliminate the timing signal from the bipolar pulse train which is applied to the blocking oscillators.

It is to be understood that the above-described arrangements are illustrative of the application of the principles of the invention. Numerous other arrangements may be devised by those skilled in the art without departing from the spirit and scope of the invention.

What is claimed is:

1. Apparatus for regenerating a bipolar pulse train comprising means to derive a timing signal from said bipolar pulse train comprising a full-wave rectifier, a filter connected to the output of said rectifier, and an amplifier connected to the output of said filter, a flip-flop circuit to generate a bipolar pulse train, and gating means connected between the output of said amplifier and the input of said flip-flop circuit to insure that said generated bipolar pulse train is timed by said timing signal output from said amplifier.

2. Apparatus for regenerating a bipolar pulse train comprising means to derive a timing signal from said bipolar pulse train comprising a full-wave rectifier connected to receive said bipolar pulse train, a filter connected to the output of said rectifier, and an amplifier connected to the output of said filter, two blocking oscillators to generate a bipolar pulse train, and gating means connected between the output of said amplifier and the inputs of said blocking oscillators to insure that said generated bipolar pulse train is timed by said timing signal output from said amplifier.

3. Apparatus for regenerating an input signal consisting of a bipolar pulse train with a timing signal superimposed thereon comprising means for deriving said timing signal portion from said input signal, means for obtaining said bipolar pulse train portion of said input signal, means for generating a bipolar pulse train, gating means connected to the outputs of said means for obtaining said bipolar pulse train and said means for deriving said timing signal and to the input of said pulse generating means to insure that said generated bipolar pulse train is timed by said obtained timing signal, and means coupled to the output of said pulse generator means for adding said obtained timing signal to said generated bipolar pulse train.

4. Apparatus for regenerating an input signal consisting of a bipolar pulse train with a timing signal superimposed thereon comprising a filter connected to receive said input signal and an amplifier connected to the output of said filter for deriving said timing signal portion from said input signal, a band rejection filter connected to receive said input signal for obtaining said bipolar pulse train portion of said input signal, a flip-flop circuit for generating a bipolar pulse train, gating means connected to the output of said amplifier, the output of said band rejection filter and the input of said flip-flop circuit to insure that said generated bipolar pulse train is timed by said obtained timing signal, and means coupled to the output of said flip-flop circuit for adding said obtained timing signal to said generated bipolar pulse train.

5. Apparatus for regenerating an input signal consisting of a bipolar pulse train with a timing signal superimposed thereon comprising a filter connected to receive said input signal and an amplifier connected to the output of said filter for deriving said timing signal portion from said input signal, a band rejection filter connected to receive said input signal for obtaining said bipolar pulse train portion of said input signal, two blocking oscillators for generating a bipolar pulse train, gating means connected to the output of said amplifier, the output of said band rejection filter and the inputs of said blocking oscillators to insure that said generated bipolar pulse train is timed by said obtained timing signal, and means coupled to the outputs of said blocking oscillators for adding said obtained timing signal to said generated bipolar pulse train.

References Cited in the file of this patent

UNITED STATES PATENTS

| | | |
|---|---|---|
| 2,585,571 | Mohr | Feb. 12, 1952 |
| 2,700,696 | Barker | Jan. 25, 1955 |
| 2,827,574 | Schneider | Mar. 18, 1958 |